US008756386B2

(12) United States Patent
Tokoro

(10) Patent No.: US 8,756,386 B2
(45) Date of Patent: Jun. 17, 2014

(54) BACKUP APPARATUS, BACKUP METHOD AND COMPUTER READABLE MEDIUM HAVING A BACKUP PROGRAM

(75) Inventor: Hirotomo Tokoro, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 722 days.

(21) Appl. No.: 12/546,243

(22) Filed: Aug. 24, 2009

(65) Prior Publication Data

US 2010/0058015 A1    Mar. 4, 2010

(30) Foreign Application Priority Data

Aug. 28, 2008  (JP) ................................ 2008-220423

(51) Int. Cl.
*G06F 13/00*  (2006.01)
*G06F 13/28*  (2006.01)

(52) U.S. Cl.
USPC ..... 711/162; 711/170; 711/161; 711/E12.103

(58) Field of Classification Search
None
See application file for complete search history.

(56) References Cited

U.S. PATENT DOCUMENTS

| | | | | |
|---|---|---|---|---|
| 2004/0254964 | A1* | 12/2004 | Kodama et al. | 707/204 |
| 2005/0086445 | A1* | 4/2005 | Mizuno et al. | 711/162 |
| 2006/0031637 | A1 | 2/2006 | Komikado et al. | |
| 2006/0075200 | A1 | 4/2006 | Satoyama et al. | |
| 2006/0143418 | A1 | 6/2006 | Takahashi et al. | |
| 2006/0242378 | A1 | 10/2006 | Kano | |
| 2007/0271429 | A1 | 11/2007 | Eguchi et al. | |
| 2008/0104350 | A1 | 5/2008 | Shimizu et al. | |
| 2009/0157956 | A1* | 6/2009 | Kano | 711/112 |

FOREIGN PATENT DOCUMENTS

| | | |
|---|---|---|
| JP | 2005-535008 | 11/2005 |
| JP | 2006-048300 | 2/2006 |
| JP | 2006-099748 | 4/2006 |
| JP | 2006-107162 | 4/2006 |
| JP | 2006-302258 | 11/2006 |
| JP | 2007-310631 | 11/2007 |
| JP | 2008-112276 | 5/2008 |
| WO | 03/102823 | 12/2003 |

* cited by examiner

*Primary Examiner* — Eric S Cardwell
(74) *Attorney, Agent, or Firm* — Staas & Halsey LLP

(57) ABSTRACT

A backup apparatus and method which stores backup data into a backup data storage area includes detecting whether to increase a capacity of the backup data storage area, assigning a storage area, within an addition-source area set as a storage area permitted to be additionally assigned as the backup data storage area, when a storage area the capacity of which is to be increased is detected, detecting whether to increase the capacity of the addition-source area, and setting the addition-source area in a free storage area as the backup data storage area when detecting that the capacity of the addition-source area is to be increased.

8 Claims, 15 Drawing Sheets

FIG. 4

| GENERATION INFORMATION | SDV MANAGEMENT INFORMATION | | | | ADDITION OF SDPE |
|---|---|---|---|---|---|
| | RAID GROUP IDENTIFICATION INFORMATION | CAPACITY USED | STARTING PHYSICAL ADDRESS | CURRENTLY USED LBA | |
| SDV FOR 1ST GENERATION | A | 500M | 200 | 200, 210, .... | ○ |
| SDV FOR 2ND GENERATION | A | 500M | 700 | ⋮ | ○ |
| SDV FOR 3RD GENERATION | A | 500M | 1200 | ⋮ | ○ |
| SDV FOR 4TH GENERATION | A | 500M | 1700 | ⋮ | |
| SDV FOR 5TH GENERATION | A | 500M | 2200 | ⋮ | |
| SDV FOR 6TH GENERATION | A | 500M | 2700 | ⋮ | |
| ⋯ | ⋯ | ⋯ | ⋯ | ⋯ | |

FIG. 5

| RAID GROUP IDENTIFICATION INFORMATION | SDP MANAGEMENT INFORMATION | | |
|---|---|---|---|
| | CAPACITY USED | STARTING PHYSICAL ADDRESS | ADDED LBA |
| A | 500M | 5000 | 5000~5200 |
| B | 700M | 1000 | ⋮ |
| C | 700M | 300 | ⋮ |
| D | 700M | 800 | ⋮ |

FIG. 6

| RAID GROUP IDENTIFICATION INFORMATION | SDPE MANAGEMENT INFORMATION ||||
|---|---|---|---|---|
| | GENERATION INFORMATION | CAPACITY USED | STARTING PHYSICAL ADDRESS | CURRENTLY USED LBA |
| A | SDV FOR 1ST GENERATION | 100M | 5000 | 5010,5020... |
| A | SDV FOR 2ND GENERATION | 100M | 5100 | |
| B | SDV FOR 3RD GENERATION | 100M | 1000 | |
| ... | ... | ... | ... | ... |

FIG. 8

| MAIL SEND | INFORMS BY MAIL |
|---|---|
| DELETE OLDEST SESSION | DELETES OLD SNAPSHOT DATA UNTIL PREDETERMINED USE RATE IS REACHED |
| WRITE PROTECT | DISABLES SUBSEQUENT DATA WRITING |

BACKUP APPARATUS, BACKUP METHOD AND COMPUTER READABLE MEDIUM HAVING A BACKUP PROGRAM

CROSS-REFERENCE TO RELATED APPLICATIONS

This application is based upon and claims the benefit of priority of the prior Japanese Patent Application No. 2008-220423, filed on Aug. 28, 2008, the entire contents of which are incorporated herein by reference.

BACKGROUND

1. Field

An embodiment(s) of the present invention relates to a backup apparatus, a backup method and a backup program.

2. Description of the Related Art

As one of techniques for backing up a copy-source volume in a storage product or a computer for each generation, One Point Copy (OPC) or SnapOPC are used. As shown in FIG. 15, in OPC or SnapOPC, a storage area with a predetermined capacity is assigned to each generation in a backup apparatus, and backup data is stored in the assigned storage area.

For example, in the example shown in FIG. 15, the backup apparatus stores backup data of a copy-source volume for "Monday" in a storage area assigned to "Monday". The backup apparatus stores backup data of a copy-source volume for "Tuesday" in a storage area assigned to "Tuesday". FIG. 15 illustrates a typical technique.

Generally, there has been used an addition technique of, when an assigned storage area with a predetermined capacity is not enough to store backup data, assigning an additional storage area to the generation for which the capacity is insufficient. For example, in the example illustrated in FIG. 15, the backup apparatus assigns an additional storage area to "Tuesday" for which the capacity of an assigned storage area is insufficient.

Here, as illustrated in FIG. 15, the backup apparatus assigns a storage area with a predetermined capacity from a storage area permitted to be used as an additional storage area. The storage area permitted to be used as an additional storage area is set by a user.

There are also a technique for reading out data for any generation, a technique for copying data, a technique for managing a storage device, a technique for rearranging data distributed in multiple storages, and the like.

However, the typical technique described above has problem(s) in that it is not possible to appropriately set the storage area permitted to be used as an additional storage area. That is, for example, if it is not possible to newly add an additional storage area because of shortage of capacity, it is required to wait for a user to newly set the storage area permitted to be used as an additional storage area.

SUMMARY

According to an aspect of an embodiment, a backup apparatus and method which store backup data into a backup data storage area including detecting whether to increase a capacity of the backup data storage area, assigning, a storage area which is not assigned yet to the data storage area, within an addition-source area set as a storage area permitted to be additionally assigned as the backup data storage area, when detecting that the capacity is to be increased, detecting whether to increase a capacity of the addition-source area, and setting the addition-source area in a free storage area which is not assigned as the backup data storage area when detecting that the capacity of the addition-source area is to be increased.

The object and advantages of the embodiment(s) will be realized and attained by means of the elements and combinations particularly pointed out in the claims.

It is to be understood that both the foregoing general description and the following detailed description are exemplary and explanatory and are not restrictive of the embodiment(s), as claimed.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 4 illustrates an SDV management information storage section in an embodiment;

FIG. 5 illustrates an SDP management information storage section in an embodiment;

FIG. 6 illustrates an SDPE management information storage section in an embodiment;

FIG. 8 illustrates an example of policies used by a policy operation section in an embodiment;

DETAILED DESCRIPTION OF EMBODIMENTS

Figure 1:
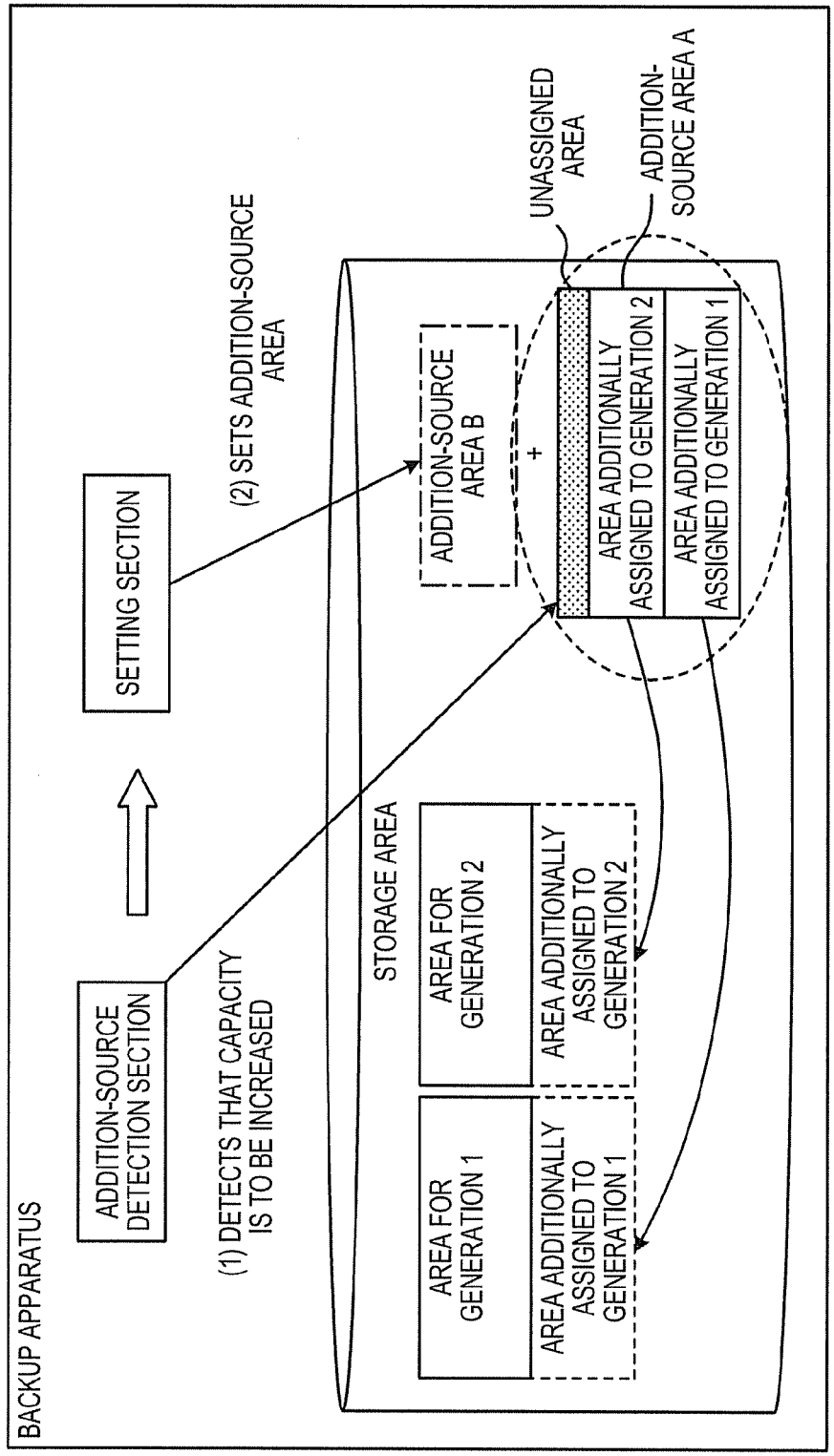
FIG. 1 illustrates an outline of a backup apparatus according to an embodiment.

Reference will now be made in detail to the embodiments, examples of which are illustrated in the accompanying drawings, wherein like reference numerals refer to the like elements throughout. The embodiments are described below to explain the present invention by referring to the figures.

Embodiments of a backup apparatus, a backup method and a backup program embodied in a computer readable storage medium according to the present invention will be described below with reference to accompanying drawings. The outline of a backup apparatus according to an embodiment, a configuration of the backup apparatus and a flow of processing is described, and other embodiments will be described.

First, an exemplary outline of a backup apparatus according to an embodiment will be described with the use of FIG. 1.

As illustrated in FIG. 1, the backup apparatus according to an embodiment is provided with an addition-source area, for example an "addition-source area A", set as a storage area permitted to be additionally assigned to a generation for which the capacity is to be increased.

Here, as shown in (1) in FIG. 1, an addition-source detection section detects whether the capacity of an addition-source area is to be increased, in the backup apparatus according to an embodiment. For example, the backup apparatus detects whether the capacity of an unassigned area, which is not assigned to any generation, is insufficient among areas within the "addition-source area A" in FIG. 1. The unassigned area is illustrated as an area in gray, which is not assigned to a "generation 1" or a "generation 2" in FIG. 1.

Then, in the backup apparatus according to an embodiment, when it is detected that the capacity is to be increased, a setting section sets an addition-source area in a free storage area which is not assigned to any generation. For example, the setting section sets an "addition-source area B" in the free storage area. In other words, in the backup apparatus according to an embodiment, an addition-source area is set in a free storage area which is not assigned as a backup data storage area.

Thus, the backup apparatus according to an embodiment is capable of appropriately setting an addition-source area. For example, when the capacity of an addition-source area is insufficient, the apparatus can automatically set an addition-source area, unlike the technique in which it is required to wait until a user newly sets an addition-source area. As a result, it is possible to assign a new additional storage area without having to wait for setting of an addition-source area by the user.

Figure 2:
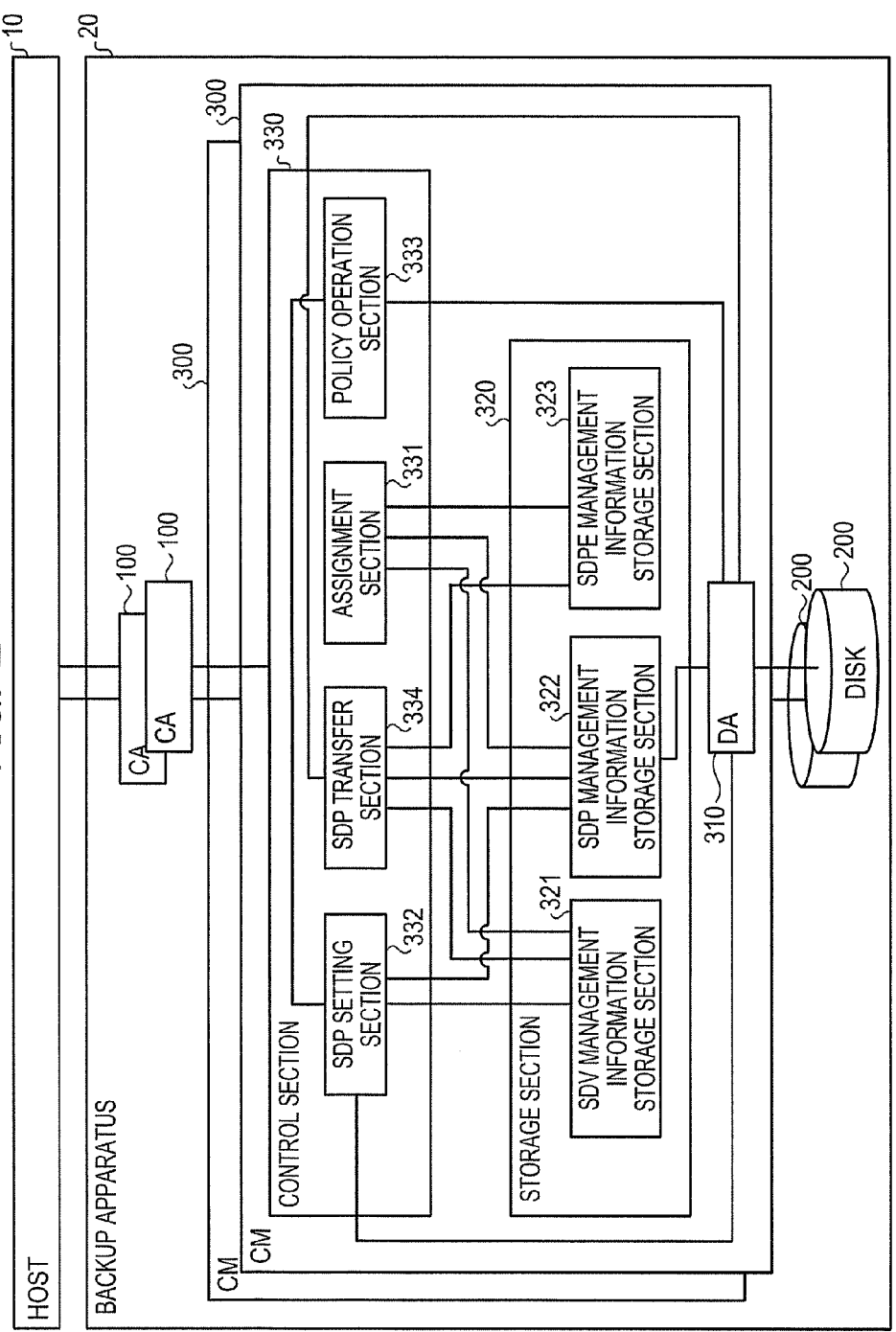
FIG. 2 illustrates a block configuration of a backup apparatus according to an embodiment.

Next, a configuration of a backup apparatus 20 illustrated in FIG. 1 is described with the use of FIG. 2.

The backup apparatus 20 stores a snapshot, which is a copy-source volume (backup-source data) for a generation, into a storage area assigned to each of generations for which backup is to be executed. The backup apparatus 20 is, for example, an apparatus which executes SnapOPC or OPC.

OPC is a backup technique for creating a snapshot, which is data at a predetermined time point, of data to be backed up. Specifically, OPC is a technique for, backing up all the data of a target copy-source volume at the time point of the creation when creating a backup. SnapOPC is a technique for backing up only the data before update at a position within the data of a copy-source volume where the update has been performed, when creating a backup. That is, according to SnapOPC, it is possible to reduce the storage area required for backup because a copy-destination storage area is not used unless a copy-source volume is updated.

For example, the backup apparatus assigns an SDV (Snap Data Volume) with a predetermined storage capacity for each generation. If there is an SDV with an insufficient capacity, among the SDVs assigned to the generations, the backup apparatus adds an SDPE (Snap Data Pool Element), which is an additional storage area. Here, the backup apparatus adds an SDPE using a storage area which has not been added yet within an SDP (Snap Data Pool), which is a storage area set by a user.

Description is made below on the assumption that the backup apparatus 20 executes SnapOPC unless otherwise especially mentioned.

As shown in FIG. 2, the backup apparatus 20 is connected with a host 10 via a CA (Channel Adapter) 100, and is provided with the CA 100, a disk 200 and a CM (Centralized Module) 300.

Since processing for the backup apparatus 20 to store a snapshot is similar to processing by SnapOPC or OPC, description thereof will be simplified or omitted.

Here, the host 10 is connected to the backup apparatus 20 via the CA 100. The host 10, for example, is an apparatus used by an administrator who manages the backup apparatus 20, which may be a computer terminal for example. The host 10 transmits, for example, an instruction to create a snapshot, an instruction to set an SDP from the administrator, an instruction to extend a copy-source volume, an instruction to add a copy-source volume, or the like to the backup apparatus 20 via the CA 100.

Each section of the backup apparatus 20 is described in detail below. The CA 100 is connected to the host 10 and the CM 300. The CA 100 is an I/F control section for the host 10 and the CM 300, and it controls transmission/receiving of information between the host 10 and the CM 300. For example, the CA 100 controls processing for receiving an instruction for transmitting an instruction to create a snapshot, an instruction to set an SDP from the administrator, an instruction to extend a copy-source volume or an instruction to add a copy-source volume, from the host 10 and sending the processing to the CM 300. The CA 100 also controls processing for transmitting a response to the instruction from the CM 300 to the host 10.

The disk 200 is connected to the CM 300 via a DA (Disk Adapter) 310 to be described later, and is a storage medium for storing data to be used for backup processing. The disk 200 is, for example, a disk device such as an HDD (Hard Disk Drive), a magneto-optical disk (MO disk) and a solid-state disk (SSD). The disk 200 may be any storage device for storing information, and is not limited to a storage device having a "disk".

Furthermore, the disk 200 is not limited to one storage device. It may have multiple storage devices. Description will be made below on the assumption that the disk 200 has multiple RAID groups, for example, RAID groups "A" to "E".

The disk 200 stores a copy-source volume and stores a snapshot. The backup apparatus 20 is not limited to the case where a copy-source volume is stored in the disk 200. For example, the backup apparatus 20 may be connected to a storage device in which a copy-source volume is stored, via a network. For example, a copy-source volume is stored in the disk 200 by the administrator in advance.

The disk 200 will be further described from a viewpoint that it stores a snapshot. For each of generations for which backup is to be executed, the disk 200 stores a snapshot created for a generation specified by an instruction, in a storage area assigned to the generation specified by the instruction. For example, the snapshot is stores into the disk 200 by an instruction from a control section 330.

Here, the disk 200 is an SDV or an SDPE, which is a storage area set at an Logical Volume Number (LUN) in the disk 200. For example, the LUN is identified by being given a number.

The SDV is a storage area with a predetermined capacity which is assigned to a generation to obtain a backup of data at the time of starting executing backup. Specifically, the SDV is a volume whose actual capacity (referred to as a "physical capacity" here) is less than the capacity identified by the host 10 (referred to as a "logical capacity" here), and it stores snapshot data corresponding to difference due to update.

In an embodiment, description is made on the assumption that an SDV is already assigned to each generation.

Description is made, for example, on the case where the capacity of a copy-source volume to be backed up is "1 G" and the capacity assigned to each generation as an SDV is "500M", as an example. Here, "1 G" indicates 1 G bytes and "500M" indicates 500 M bytes. When the host 10 accesses an SDV, it is recognized that a snapshot corresponding to "1 G", which is the capacity of a copy-source volume, is stored. This is because the backup apparatus 20 shows not only updated difference data which is stored in the SDV but also data which has not been updated and not stored in the SDV, to the host 10 as the data held in the SDV. As for the data of a position of the copy-source volume which has not been updated and is not stored in the SDV, for example, data of the position of the copy-source volume at the current time point is used.

The SDPE is a storage area to be added when the capacity of an SDV is in sufficient. The SDPE is a storage area with a predetermined capacity, which is assigned from an unassigned storage area within an SDP, and an addition-source area set as a storage area permitted to be additionally assigned. That is, the SDPE is assigned including for the purpose of avoiding data overflow when the capacity of an SDV is insufficient and all backup data for a corresponding generation is not stored in the SDV. The SDPE is assigned to each generation on a predetermined-capacity basis. For example, a capacity of "100M" is assigned. However, the backup apparatus 20 is not limited to the case where an SDPE is assigned on a predetermined-capacity basis. For example, an SDPE with any capacity may be assigned.

The SDP is a storage area permitted to be used as an additional storage area. For example, the SDP is set by a user, or is set by an SDP setting section 332 to be described in detail below. In an embodiment, a storage area permitted to be used as an additional storage area (SDPV (Snap Data Pool Volume)) is set in a storage area within each RAID group. The SDP will be described as an aggregate of SDPV's.

Figure 3:
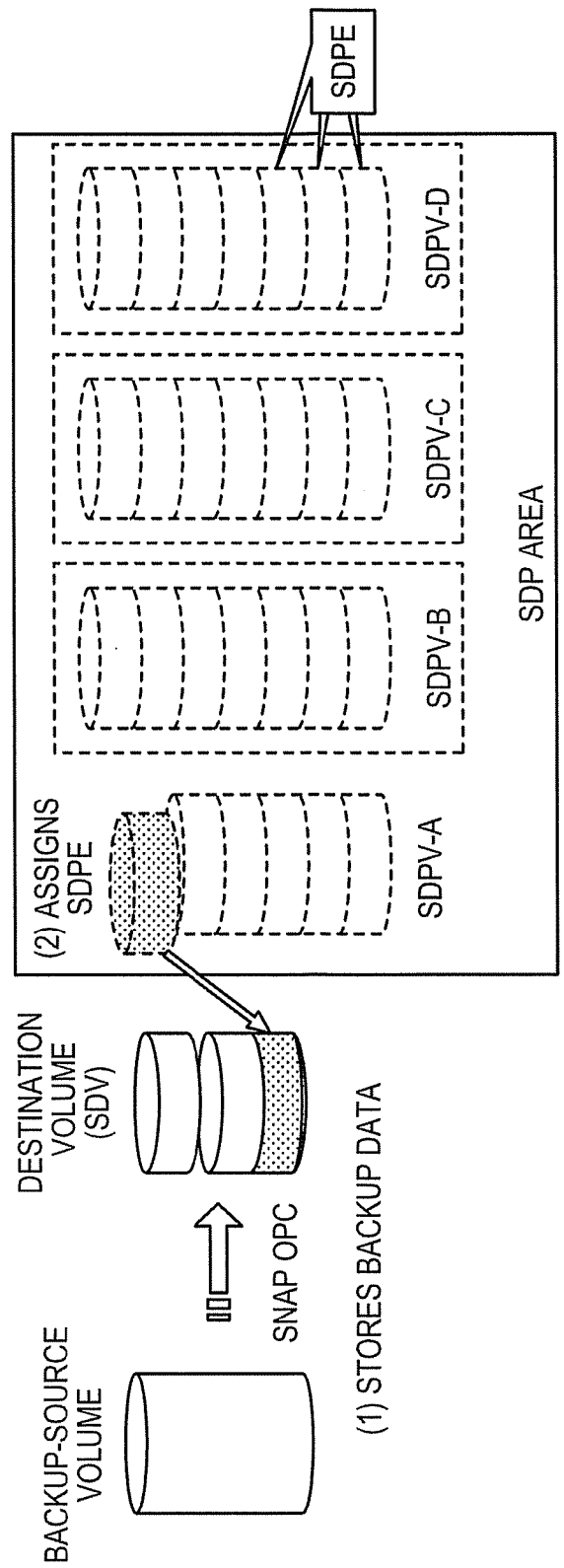
FIG. 3 illustrates an SDV, an SDP and an SDPE in an embodiment.

Now, the case where the SDV, the SDPE and the SDP are used is further described with the use of FIG. 3. FIG. 3 illustrates the SDV, the SDP and the SDPE in an embodiment. As illustrated in (1) in FIG. 3, the backup apparatus 20 (FIG. 2) stores backup data in an SDV assigned to a corresponding generation. After that, when the backup data cannot be stored in the SDV, the backup apparatus 20 stores the backup data into an SDPE assigned from the SDP as illustrated in (2) in FIG. 3. "SDPV-A" illustrated in FIG. 3 is an SDPV set in a storage area in the RAID group "A".

Here, the storage areas existing in the disk 200 will be briefly described. A copy-source volume is stored in the disk 200, and a snapshot is stored in an SDV or an SDP set in the disk 200.

The storage areas existing in the disk 200 include not only the storage area in which a copy-source volume is stored and the areas set as an SDV and an SDPE but also a free storage area which is not assigned to any generation. In other words, the storage areas existing in the disk 200 also include a free storage area which is not assigned as an area for storing a copy-source volume or backup data.

The CM 300 (FIG. 2) is connected with the CA 100 and the disk 200 and is configured to execute various backup processings. The CM 300 is provided with the DA 310, a storage section 320 and a control section 330.

The backup apparatus 20 is provided with one or multiple CMs 300. Each of the CMs 300 is in charge of one or multiple disks 200 and performs processing for the disk 200 which the CM 300 is in charge of.

The DA 310 is connected with the disk 200 and the control section 330. The DA 310 is an I/F control section for the disk 200 and the control section 330, and it controls transmission/receiving of information to and from the disk 200. For example, the DA 310 controls processing for storing or deleting snapshot data into or from the disk 200 and controls processing for reading a snapshot from the disk 200, in accordance with an instruction from the control section 330.

The storage section 320 is connected with the control section 330 and stores data used for backup processing by the control section 330. The storage section 320 is, for example, a cache. As illustrated in FIG. 2, the storage section 320 is provided with an SDV management information storage section 321, an SDP management information storage section 322 and an SDPE management information storage section 323.

The SDV management information storage section 321 is connected to an assignment section 331 to be described in detail below, the SDP setting section 332 and an SDP transfer section 334 to be described in detail below, and it stores SDV management information for managing an SDV assigned to each generation.

For example, as shown in FIG. 4, the SDV management information storage section 321 stores "RAID group identification information", "capacity used (resolution)", "starting physical address" and "currently used LBA (Logical Block Address) in association with "generation information" identifying a generation. FIG. 4 is a diagram for illustrating the SDV management information storage section in an embodiment.

Here, generation information "the first generation SDV" indicates a generation "the first generation SDV". The "RAID group identification information" is information identifying a RAID group. In the SDV management information storage section 321, the RAID group identification information indicates a RAID group having a storage area assigned as an SDV. RAID group identification information "A" indicates the RAID group "A".

The "capacity used" (resolution) indicates the capacity of a storage area (the capacity used in the disk 200 when the storage area is assigned). In the SDV management information storage section 321, "capacity used" (resolution) indicates the capacity of a storage area assigned to an associated generation as an SDV.

The "starting physical address" is information uniquely identifying an area in a storage area. In the SDV management information storage section 321, "starting physical address" indicates information identifying an area where a storage area assigned to an associated generation as an SDV starts.

The "currently used LBA" indicates an address at which backup data is stored in a storage area. In the SDV management information storage section 321, "currently used LBA" indicates an address indicating an area where backup data is stored, within a storage area assigned as an SDV. The backup data is all or a part of a snapshot.

For example, as illustrated in FIG. 4, the SDV management information storage section 321 stores the RAID group identification information "A", a capacity used "500M", a starting address "200", and currently used LBA's "200, 210, . . . " in association with the generation information "the first generation SDV". That is, the SDV management information storage section 321 stores that an area identified by the capacity used "500M" and the starting address "200", within the storage area existing in the RAID group identification information "A", has been assigned to the "first generation SDV" as an SDV. The SDV management information storage section 321 also stores information indicating that backup data is stored in a storage area identified by the currently used LBA's "200, 210, . . . " within the SDV assigned to the "first generation SDV".

In an embodiment, a technique for identifying a storage area using the RAID identification information, the capacity used and the starting address is described. However, the present invention is not limited thereto. For example, a number of blocks from the starting address may be used instead of the capacity used. The number of blocks is the number of unit areas provided in a storage area.

The SDV management information storage section 321 stores, for each generation, "addition of SDPE" indicating whether an SDPE has been added. In the example illustrated in FIG. 4, the SDV management information storage section 321 stores "O" for "addition of SDPE" when an SDPE is added. For example, "O" for "addition of SDPE" is stored in association with the generation information "the first generation SDV".

Among the information stored in the SDV management information storage section 321, the "RAID group identification information", "capacity used" (resolution) and "starting physical address" associated with each generation information are inputted by the assignment section 331 when an SDP is assigned. The currently used LBA is inputted by the control section 330 when data is stored into an SDV.

The information stored in the SDV management information storage section 321 is used by the control section 330 or the SDP transfer section 334.

The SDP management information storage section 322 is connected to the assignment section 331, the SDP setting section 332 and the SDP transfer section 334, and it stores, for each RAID group, SDP management information for managing each SDPV set in the storage area in the RAID group. In the example illustrated in FIG. 5, the SDP management information storage section 322 stores the "capacity used, the "starting physical address" and the "added LBA" as the SDP management information, in association with each "RAID group identification information". FIG. 5 is a diagram for illustrating the SDP management information storage section in an embodiment.

Here, the "added LBA" is a storage area assigned as an SDPE within an SDP.

In the example illustrated in FIG. 5, the SDP management information storage section 322 stores the capacity used "500M", the starting physical address "5000" and the added LBA "5000 to 5200" in association with the RAID group identification information "A". That is, the SDP management information storage section 322 stores that an SDP is set for a storage area identified by the starting physical address "5000" and the capacity used "500M" in a RAID group identified by the RAID group identification information "A". The SDP management information storage section 322 also stores information indicating that "5000 to 5200", within the storage area for which the SDP is set, have already been assigned.

Among the information stored in the SDP management information storage section 322, the "RAID group identification information", the "capacity used" and the "starting physical address" are inputted by the SDP setting section 332 or the administrator when an SDPV is set and used as an SDP. The "added LBA" is inputted by the assignment section 331 when an SDPE is assigned.

The information stored in the SDP management information storage section 322 is used by the assignment section 331 and the SDP transfer section 334.

The SDPE management information storage section 323 is connected to the assignment section 331 and the SDP transfer section 334. The SDPE management information storage section 323 stores, for each generation, SDPE management information for managing an SDPE assigned to the generation. In the example illustrated in FIG. 6, the SDPE management information storage section 323 stores, for each RAID group identification information, the "capacity used", the "starting physical address" and the "currently used LBA" in association with the "generation information".

In the example illustrated in FIG. 6, the SDPE management information storage section 323 stores the generation information "the first generation SDV", the capacity used "100M", the starting physical address "5000" and the currently used LBA's "5010, 5020 . . . " in association with the RAID group identification information "A". That is, the SDPE management information storage section 323 stores that a storage area identified by the capacity used "100M" and the starting address "5000", within an SDPV set in the RAID group "A", has been assigned to the generation "the first generation SDV" as an SDPE. The SDPE management information storage section 323 also stores information indicating that backup data is stored in a storage area identified by the currently used LBA's "5010, 5020, . . . ".

The "generation information", "capacity used" and "starting physical address" associated with the RAID group identification information, among the information stored in the SDPE management information storage section 323, are inputted by the assignment section 331 when the SDPE is assigned. The currently used LBA's, among the information stored in the SDPE management information storage section 323, are inputted by the control section 330 when backup data is stored into the SDPE.

The control section 330, for example, has an internal memory for storing a program in which various backup processing procedure(s) and the like are specified and executes various backup processings. The control section 330 is provided with the assignment section 331, the SDP setting section 332, a policy operation section 333 and an SDP transfer section 334.

When receiving an instruction to store a snapshot, from the host 10 via the CA 100, the control section stores the snapshot into the disk 200. For example, when storing a snapshot, the control section 330 refers to the SDV management information storage section 321 or the SDPE management information storage section 323 to identify an SDV or an SDPE to store the snapshot, and stores the snapshot therein if there is free space. Specifically, if "O" is specified for "addition of SDPE" in the SDV management information storage section 321, the control section 330 acquires information identifying an SDPE to store the snapshot, from the SDPE management information storage section 323 and stores the snapshot therein. If "O" is not specified for "addition of SDPE" in the SDV management information storage section 321, the control section 330 acquires information identifying an SDV to store the snapshot, from the SDV management information storage section 321 and stores the snapshot therein. The control section 330 also inputs information identifying the storage area in which the snapshot is stored as a currently used LBA in the SDV management information storage section 321 or the SDPE management information storage section 323.

If there is no free space in the SDV or SDPE to store the snapshot, the control section 330 waits for an SDPE to be assigned by the assignment section 331 to be described in detail below, and stores the snapshot after an SDPE is assigned.

The assignment section 331 is connected to the SDV management information storage section 321, the SDP management information storage section 322 and the SDPE management information storage section 323, and it assigns an SDV or an SDPE to each generation.

Specifically, when receiving an instruction to store a snapshot, from the host 10 via the CA 100, the assignment section 331 detects whether the capacity of an assigned storage area is to be increased. If the assignment section 331 detects that the capacity is to be increased, the assignment section 331 assigns an SDPE. Each of the detection and the assignment will be described below.

Now, the detection by the assignment section 331 will be described. In the description below, the case of detecting whether the capacity of an SDV is to be increased (detecting the SDV of a generation for which the capacity is to be increased) first, and after that, the case of detecting whether the capacity of an SDPE is to be increased (detecting the SDPE of a generation for which the capacity is to be increased) is described. For example, the assignment section 331 performs the detection using the "capacity used (resolution)", "starting physical address" and "currently used LBA" stored in the SDV management information storage section 321, for each of generations specified by an instruction.

For example, for a generation for which the capacity of an assigned SDV is insufficient, in other words, for the SDV of a generation for which there is no free space any more to store a snapshot within the capacity of the assigned SDV, detects whether the capacity is to be increased (it is necessary to increase the capacity). That is, the assignment section 331 judges there is free space corresponding to the capacity of backup data to be stored, which is identified by an instruction to store a snapshot, received from the host 10. If the free space does not exist, the assignment section 331 detects that the capacity is to be increased (it is necessary to increase the capacity).

For example, for such a generation that the free space of an assigned SDV reaches the capacity indicated by a threshold set by the administrator in advance, in other words, for the SDV of a generation for which a snapshot corresponding to the capacity indicated by the threshold has been stored, the assignment section 331 detects that the capacity is to be increased (it is necessary to increase the capacity). For example, for such a generation that the capacity corresponding to a rate (for example, 70%) set by the administrator in advance has been used, in other words, for the SDV of such a generation that the free space of the SDV reaches the rate set by the administrator in advance, the assignment section 331 detects that the capacity is to be increased (it is necessary to increase the capacity).

Description will be made on an example of a technique for detecting whether the capacity is to be increased, with the use of the "capacity used (resolution), the "starting physical address" and the "currently used LBA". For example, by identifying the capacity used from the "currently used LBA" and comparing the capacity used and the "capacity used" to calculate free space, the assignment section 331 detects whether the capacity is to be increased.

The case of performing the detection for an SDPE will be described. Similarly, the assignment section 331 detects whether the capacity of an SDPE is to be increased, using the "capacity used (resolution)", "starting physical address", and "currently used LBA" stored in the SDVE management information storage section 320 for each generation. That is, for example, after assigning an SDPE because of shortage of the free space of an SDV, the assignment section 331 detects, for the SDPE, whether free space is insufficient.

Now, the assignment will be described. When detecting an SDV or an SDPE the capacity of which is to be increased, the assignment section 331 assigns an SDPE to the detected generation from an unassigned storage area in an SDP. That is, the assignment section 331 assigns an SDPE from an SDP to such an SDV or SDPE that the assigned storage area capacity is to be increased.

Specifically, the assignment section 331 refers to the SDP management information storage section 322. Then, in association with generation information identifying a generation to which an SDPE is assigned, the assignment section 331 inputs the "RAID group identification" and "SDPE management information" about the SDPE assigned to the generation into the SDPE management information storage section 323. The assignment section 331 also inputs the "RAID group identification" and "added LBA" in association with a storage area assigned as the SDPE, into the SDP management information storage section 322. The assignment section 331 also inputs "O" for "addition of SDPE" in association with the generation information identifying the generation to which the SDPE is to be assigned, into the SDV management information storage section 321.

Description will be made on the case where an area identified by the capacity used "500M" and the starting physical address "5000" is free within an SDP set in the RAID group "A". For example, the assignment section 331 assigns a storage area identified by the capacity used "100M" and the starting address "5000", within the storage area in the RAID group "A", to the generation "the first generation SDV" as an SDPE. Here, as illustrated in FIG. 6, the assignment section 331 inputs the RAID group identification information "A", the capacity used "100M" and the starting address "5000" in association with the generation information "the first generation SDV", into the SDPE management information storage section 323. Furthermore, the assignment section 331 inputs information identifying the storage area assigned as the SDPE within the SDP set in the RAID group "A", in association with the RAID group identification information "A", as an added LBA in the SDP management information storage section 322.

For example, if there is no storage area which is not assigned yet, within an SDP at the time of assigning an SDPE, the assignment section 331 waits for an SDP to be set by the SDP setting section 332 to be described later, and assigns an SDPE after an SDP is set. The case where there is no storage area which is not assigned yet within the SDP is, for example, the case where the capacity of an unassigned area within an area set as an SDP is less than a predetermined capacity to be assigned as an SDPE (for example, the capacity used "100M").

If the assignment section 331 detects that the capacity of an SDV or an SDPE is to be increased (it is necessary to increase the capacity), the assignment section 331 sends, for example, information to the effect that there is a generation for which the capacity is to be increased (the SDV or SDPE of a generation for which the capacity is to be increased exists) to the SDP setting section 332.

The SDP setting section 332 is connected to the DA 310, the SDV management information storage section 321, the SDP management information storage section 322, the assignment section 331 and the policy operation section 333, and it sets an SDP without accepting an instruction from a user.

Description will be made on the point that the SDP setting section 332 sets an SDP without accepting an instruction from a user. Specifically, the SDP setting section 332 detects whether the capacity of an SDP is to be increased, judges whether there is free space, and sets an SDP. Each of the detection, the judgment and the setting is described in detail below.

Now, the detection will be described. When receiving the information to the effect that the assignment section 331 has detected that the capacity of an SDV or an SDPE is to be increased, the SDP setting section 332 detects whether the capacity of an SDP is to be increased. For example, the SDP setting section 332 detects whether the capacity of the SDP is to be increased using the "capacity used" (resolution), "starting physical address" and "added LBA" stored in the SDP management information storage section 322.

Here, for example, the SDP setting section 332 detects such a generation that the capacity of the SDP is insufficient, in other words, the state that the capacity of an unassigned storage area within an SDP is insufficient so that an SDPE cannot be assigned, as the state that the capacity of the SDP is to be increased (it is necessary to increase the capacity). For example, if the capacity of the unassigned storage area within an SDP is less than a predetermined capacity assigned as an SDPE, the SDP setting section 332 detects that the capacity of the SDP is to be increased.

For example, the SDP setting section 332 detects a state that the capacity of an unassigned storage area within an SDP reaches the capacity indicated by a threshold set by the administrator in advance as the state that the capacity of the SDP is to be increased. In other words, the SDP setting section 332 detects the state that an SDPE corresponding to the capacity indicated by the threshold is assigned from an SDP as the state that the capacity of the SDP is to be increased.

Furthermore, the SDP setting section 332 detects, for example, a state that an SDPE corresponding to a rate set by the administrator in advance (for example, 70%) is assigned from an SDP as the state that the capacity of the SDP is to be increased. In other words, the SDP setting section 332 detects the state that the capacity of an unassigned storage area within an SDP reaches a rate set by the administrator in advance as the state that the capacity of the SDP is to be increased.

Now, the judgment will be described. When detecting that the capacity of an SDP is to be increased, the SDP setting section 332 judges whether there is a free storage area for which setting of an SDP can be permitted. For example, the SDP setting section 332 identifies a storage area for which a copy-source volume, an SDV or an SDP is not set, within the storage area in the disk 200, using the SDV management information storage section 321 or the SDP management information storage section 322. That is, the SDP setting section 332 identifies a free storage area which is not assigned as an area for storing a copy-source volume or backup data. Then, the SDP setting section 332 judges whether a capacity of the storage area for which an SDV or an SDP is not set has a capacity enough to set an SDP. For example, if the free space of the identified storage area is equal to or above a predetermined capacity to be assigned as an SDPE, the SDP setting section 332 judges that there is a sufficient capacity, and otherwise, it judges that there is no sufficient capacity.

Figure 7:
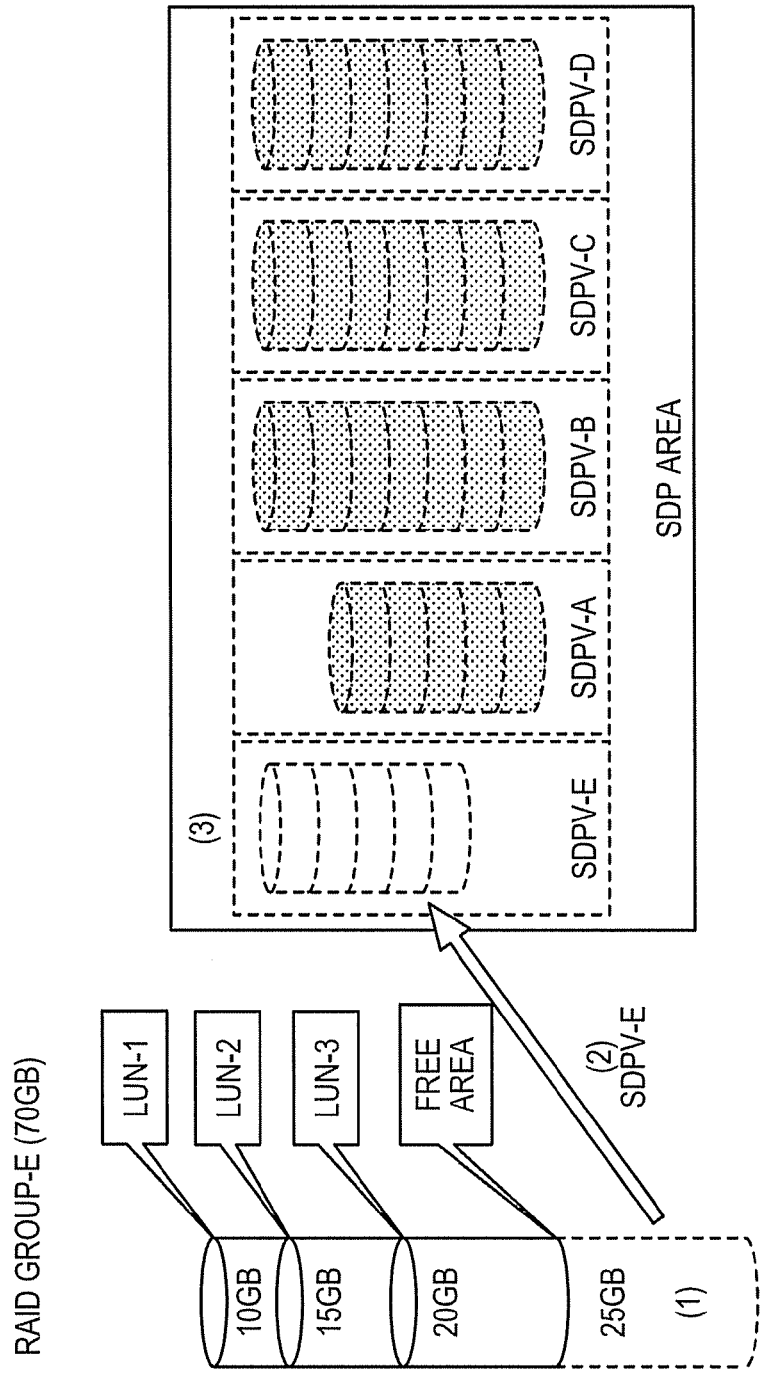
FIG. 7 illustrates an SDP setting section in an embodiment.

Now, the setting will be described. As shown in FIG. 7, when the SDP setting section 332 judges that there is a free storage area, the SDP setting section 332 sets an SDP in the free storage area which is not assigned to any generation. That is, the SDP setting section 332 sets an SDPV in a storage area in a RAID group having a free storage area which is not assigned as an area for storing a copy-source volume or backup data, and uses the SDPV as an SDP. FIG. 7 is a diagram for illustrating the SDP setting section in an embodiment.

For example, the SDP setting section 332 sets an SDPV-E as illustrated in (2) in FIG. 7 in a free space in a storage area in a RAID group "E" illustrated in (1) in FIG. 7, and uses the SDPV-E as an SDP as illustrated in (3) in FIG. 7. "LUN-1" to "LUN-3" illustrated in FIG. 7 are data stored in storage areas in the RAID group "E".

Specifically, the SDP setting section 332 inputs the "RAID group identification information", the "capacity used" and the "starting physical address" as information identifying the set SDP, into the SDP management information storage section 322. If the SDP setting section 332 judges that there is no free space, the SDP setting section 332 sends information to that effect, to the policy operation section 333. The SDP setting section 332 inputs a value whose upper limit is the capacity of the free space in the RAID group, as the "capacity used". For example, the SDP setting section 332 inputs the upper limit of the free space in the RAID group as the capacity used, or inputs the capacity corresponding to a predetermined rate of the free space in the RAID group.

For example, the SDP setting section 332 inputs the capacity used "500M" and the starting address "200" in association with the RAID group identification information "E", into the SDP management information storage section 322. That is, an SDPV is newly set in the RAID group "E" and used as an SDP.

When there is free space for setting an SDP in each of multiple RAID groups, the SDP setting section 332 determines one RAID group and sets an SDPV in the determined RAID group. When determining the one RAID group, an RAID group having the largest free space is determined among the RAID groups having free space.

The policy operation section 333 is connected to the DA 310 and the SDP setting section 332. When accepting information to the effect that it is judged that there is no free storage area, from the SDP setting section 332, the policy operation section 333 performs processing based on a policy set in advance for the purpose of avoiding shortage of the storage area for storing a snapshot. For example, as illustrated in FIG. 8, the policy operation section 333 uses "Mail Send", "Delete Oldest Session", "Write Protect" or the like, as a policy. FIG. 8 illustrates an example of policies used by the policy operation section in an embodiment.

For example, in the case of using "Mail Send", the policy operation section 333 informs the administrator to the effect that it has been judged that there is no free storage area. Furthermore, for example, in the case of using "Delete Oldest Session", the policy operation section 333 sequentially deletes snapshots stored in a storage area beginning with the snapshot for the oldest generation until the capacity is a predetermined capacity. For example, in the case of using "Write Protect", the policy operation section 333 prohibits a snapshot from being stored after it is judged that there is no free storage area.

The policy operation section 333 executes processing based on one or multiple policies specified by the administrator in advance. Since an example of detailed processing by the policy operation section 333 will be described later, description thereof will be omitted here.

The SDP transfer section 334 is connected to the SDV management information storage section 321, the SDP management information storage section 322, the SDPE management information storage section 323 and the DA 310. The SDP transfer section 334 detects, for a storage area in any RAID group among multiple RAID groups, whether the storage area has a predetermined free storage area capacity.

Description will be made on the case of setting "LUN-4" in the RAID group "E" separately from "LUN-1" to "LUN-3" which are already set, as an example. Here, the SDP transfer section 334 detects whether there is free space enough to set "LUN-4" in an area other than "LUN-1" to "LUN-3", for which an SDP or an SDV is not set, in the RAID group "E". If there is no sufficient free space, the SDP transfer section 334 detects that the predetermined free storage area capacity is not secured.

Similarly, description will be made on the case of extending storage areas set for "LUN-1" to "LUN-3" which are already set in the RAID group "E", as an example. Here, the SDP transfer section 334 detects whether there is a storage area corresponding to the capacity to be extended in an area other than "LUN-1" to "LUN-3", for which an SDP or an SDV is not set, in the RAID group "E". If there is no sufficient free space, the SDP transfer section 334 detects that the predetermined free storage area capacity is not secured.

If detecting that the predetermined free storage area capacity is not secured, the SDP transfer section 334 transfers an SDP set for a storage area in the target RAID group, which is the RAID group detected not to have the predetermined free storage area capacity, to another RAID group. Specifically, the SDP transfer section 334 transfers the SDP to a free storage area which is not assigned to any generation within the storage area in a RAID group different from the target RAID group. In other words, the SDP transfer section 334 transfers the SDP to a free storage area which is not assigned as an area for storing a copy-source volume and backup data.

If it is not possible to transfer the SDP set in the storage area in the target RAID group to a storage area in one different RAID group, the SDP transfer section 334 distributes and transfers the SDP to storage areas in multiple different RAID groups.

Figure 9:
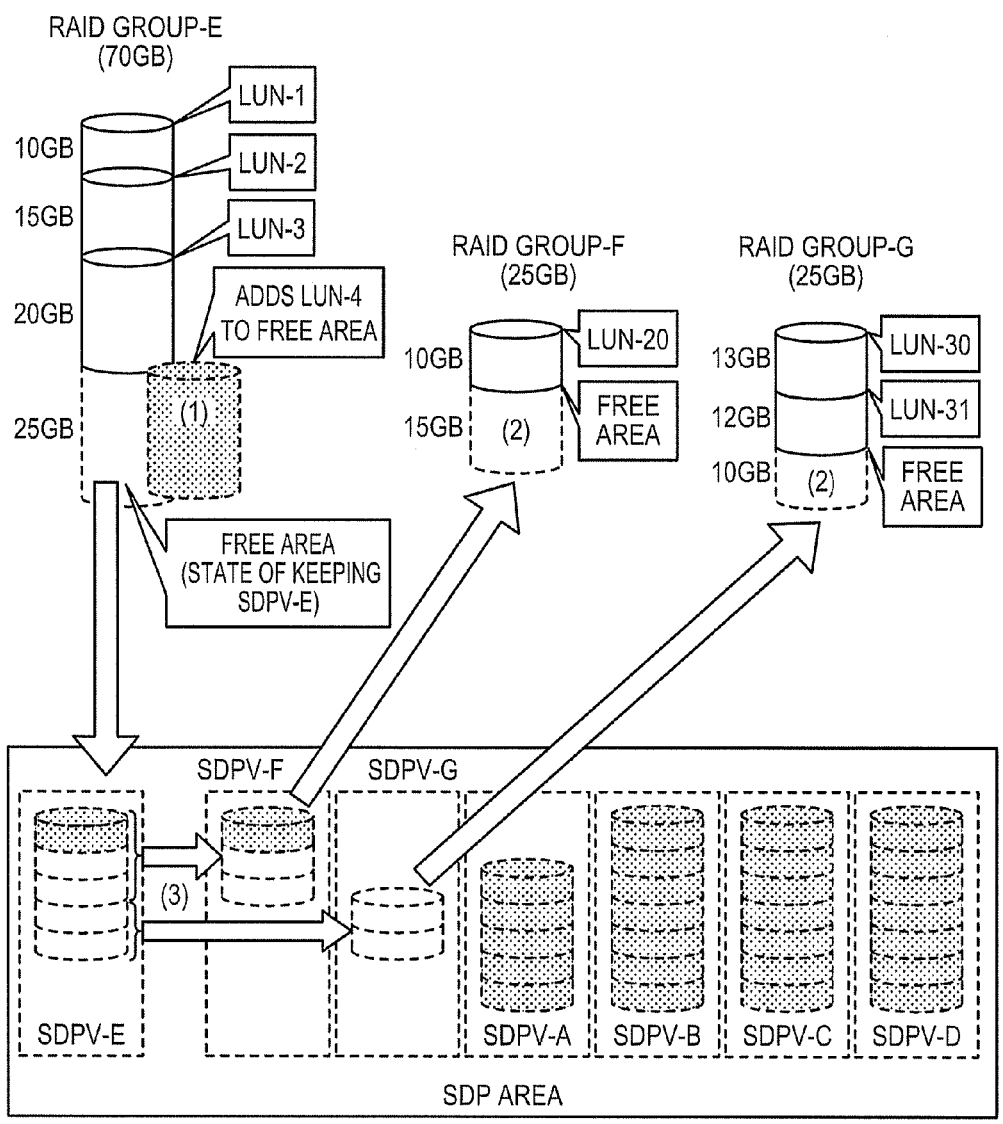
FIG. 9 illustrates an SDP transfer section in an embodiment.
Figure 10:
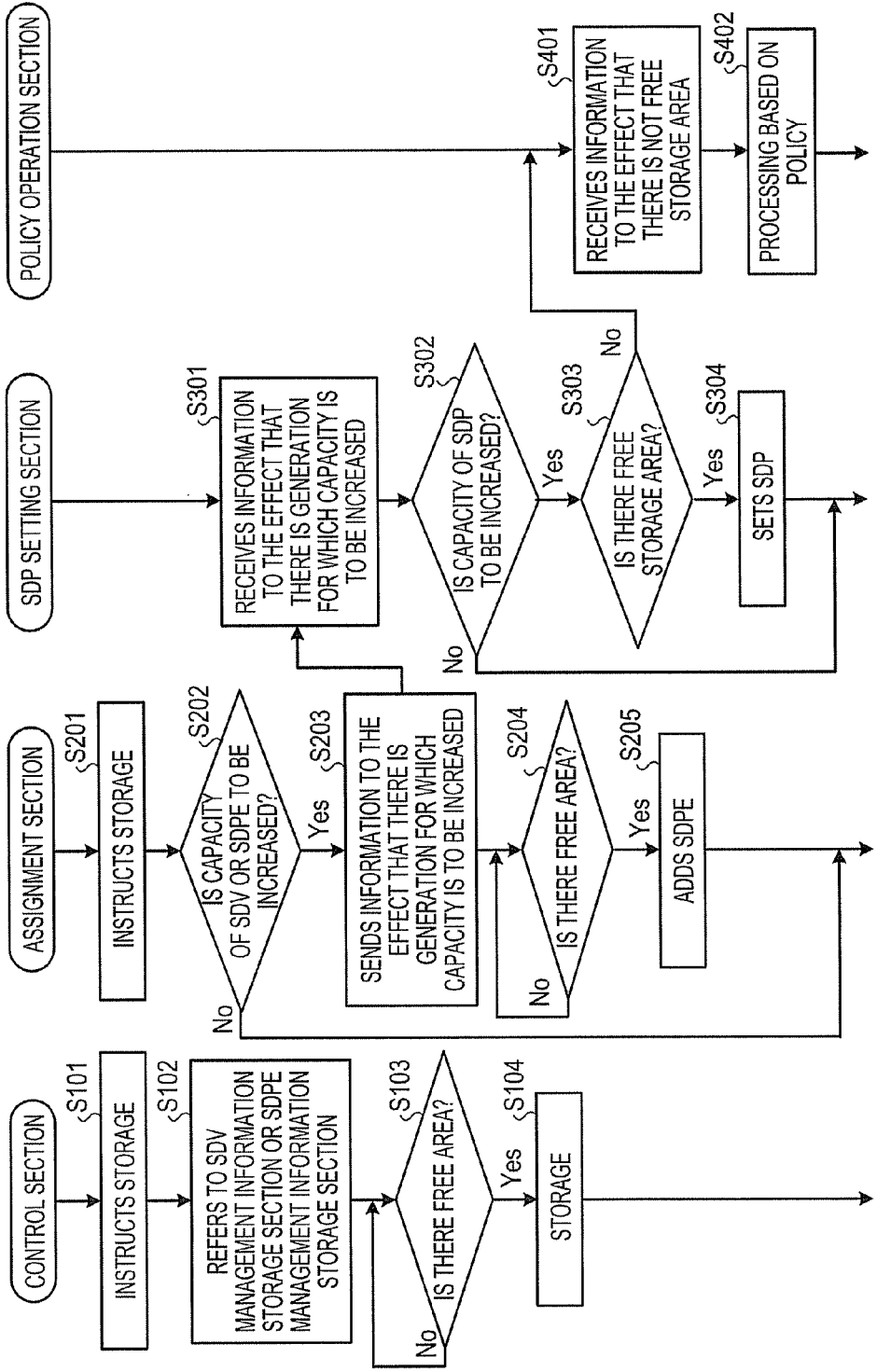
FIG. 10 illustrates an example of whole processing for setting an SDP by a backup apparatus according to an embodiment.

Description of the SDP transfer section 334 will be made on the case where, as illustrated in FIG. 9, an SDP is set for an area for which "LUN-1" to "LUN-3" are not set, within the storage area in the RAID group "E", and "LUN-4" cannot be set, as an example. FIG. 9 is a diagram for illustrating the SDP transfer section in an embodiment. Because there is no free space enough to set "LUN-4", the SDP transfer section 334 detects that the capacity is to be increased (it is necessary to increase the capacity). Then, for example, the SDP transfer section 334 transfers the SDP in the RAID group "E" to a free storage area within the storage area in the RAID group "F" and a free storage area among the storage areas in the RAID group "G".

Here, when distributing and transferring the SDP the SDP transfer section 334 distributes and transfers the SDP in SDPE. That is, in the example illustrated in FIG. 9, three SDPEs are transferred to the RAID group "F", and two SDPEs are transferred to the RAID group "G".

If an SDP is set but the SDP is in an unused state without data being stored, the SDP transfer section 334 does not perform data transfer and only makes settings as an SDP. The present invention is not limited to the case where the SDP transfer section 334 transfers all SDPs. It is also possible to transfer only a part of the SDPs. For example, in a case illustrated in FIG. 9, it is possible to transfer only three of the five SDPEs and leave the remaining two as they are set in the RAID group "E".

Since an example of detailed processing by the SDP transfer section 334 will be described in detail below, description thereof will be omitted here.

The whole processing for SDP setting by the backup apparatus 20, SDP setting processing by the SDP setting section 332, processing based on a policy and SDP transfer processing will be described with the use of FIGS. 10 to 13. Process (es) of SDP setting by the backup apparatus 20 is described with the use of FIG. 10.

In the backup apparatus 20, when receiving an instruction to store a snapshot (operation S101), the control section 330 refers to the SDV management information storage section 321 or the SDPE management information storage section 323 (operation S102). That is, the control section 330 identifies an SDV or an SDPE for storing the snapshot.

Here, when determining there is free space (operation S103: YES), the control section 330 stores the snapshot (operation S104). On the other hand, when determining there is no free space (operation S103: NO), the control section 330 waits for an SDPE to be assigned by the assignment section 331, and stores the snapshot after an SDPE is assigned (operation S104).

In the backup apparatus 20, when receiving an instruction to store a snapshot (operation S201), the assignment section 331 detects whether a capacity of an SDV or an SDPE is to be increased (operation S202). If detecting that the capacity of an SDV or an SDPE is to be increased (it is necessary to increase the capacity) (operation S202: YES), the assignment section 331 sends information to the effect that there is a generation for which the capacity is to be increased (the SDV or SDPE of a generation for which the capacity is to be increased exists) to the SDP setting section 332 (operation S203). Then, if there is a storage area which is not assigned yet in the SDP (operation S204: YES), the assignment section 331 assigns an SDPE (operation S205). On the other hand, if there is no storage area which is not assigned yet, in the SDP (operation S204: NO), the assignment section 331, for example, waits for an SDP to be set by the SDP setting section 332, and assigns an SDPE after an SDP is set (operation S205). If the assignment section 331 does not detect that the capacity of an SDV or an SDPE is to be increased (it is necessary to increase the capacity) (operation S202: NO), it ends the processing.

In the backup apparatus 20, if the assignment section 331 detects that the capacity of an SDV or an SDPE is to be increased (operation S202: YES), the SDP setting section 332 receives information to the effect that there is a generation for which the capacity is to be increased, from the assignment section 331 (operation S301). Then, the SDP setting section 332 detects whether or not to increase the capacity of an SDP (operation S302). Here, if the SDP setting section 332 detects that the capacity of the SDV is to be increased (it is necessary to increase the capacity) (operation S302: YES), the SDP setting section 332 sets an SDP (operation S304) when determining there is a free storage area which is not assigned to any generation (operation S303: YES). On the other hand, when determining there is no free storage area (operation S303: NO), the SDP setting section 332 sends information to the effect that there is no free storage area, to the policy operation section 333. If the SDP setting section 332 does not detect that the capacity of the SDP is to be increased (operation S302: NO), the SDP setting section 332 ends the processing.

In the backup apparatus 20, if the SDP setting section 332 judges that there is no free storage area (operation S303: NO), the policy operation section 333 receives information to the effect that there is no free storage area, from the SDP setting section 332 (operation S401). Then, the policy operation section 333 executes processing based on a policy (operation S402).

Figure 11:
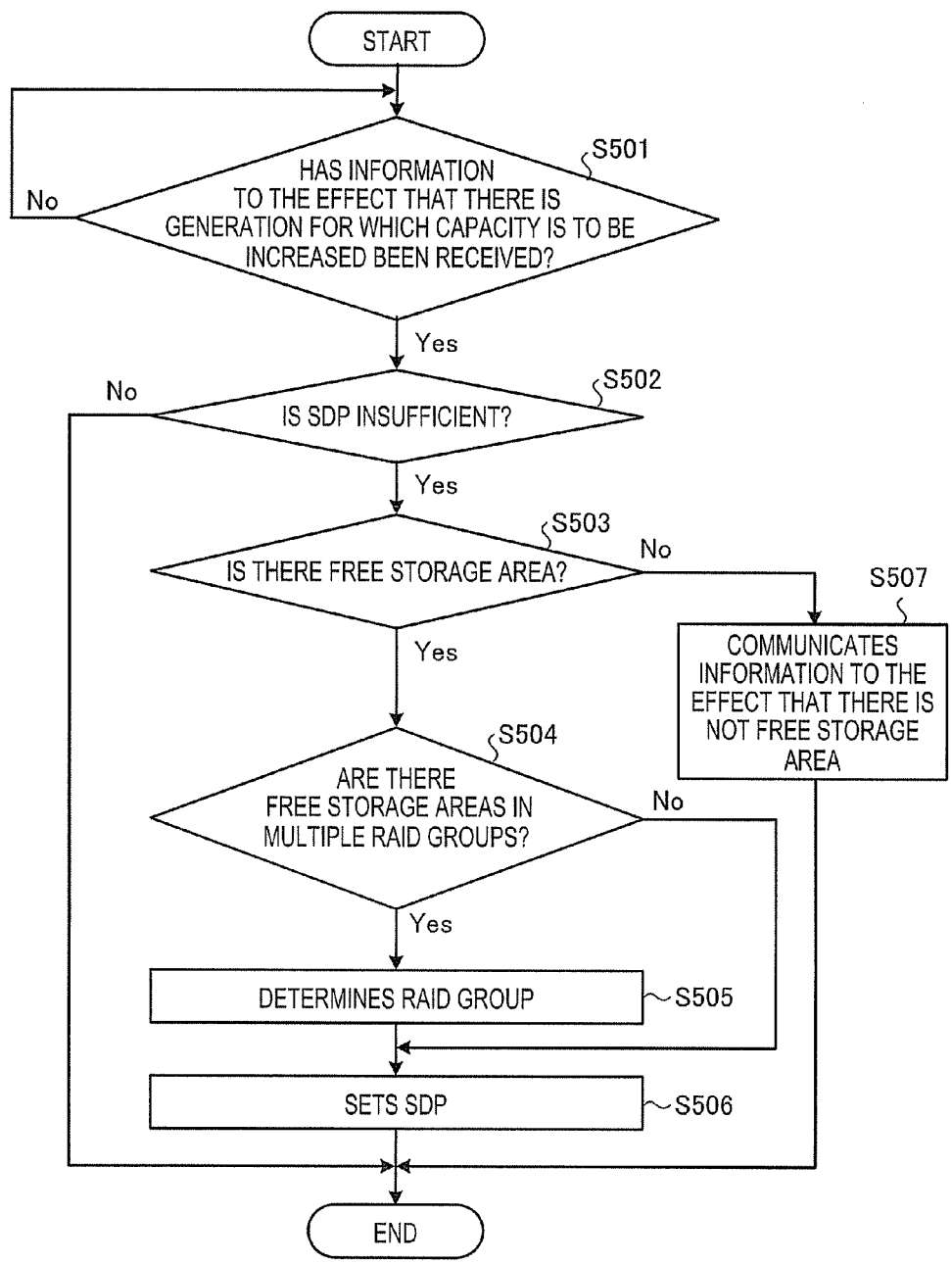
FIG. 11 illustrates an example of a flow of SDP setting processing by a backup apparatus in an embodiment.

An example of the flow of the SDP setting processing by the backup apparatus in an embodiment will be described with the use of FIG. 11. FIG. 11 illustrates an example of the flow of the SDP setting processing by the backup apparatus in an embodiment. In FIG. 11, the processing by the SDP setting section 332 described with reference to FIG. 10 will be described in detail.

As illustrated in FIG. 11, when receiving information to the effect that there is a generation for which the capacity is to be increased (operation S501: YES), that is, when receiving information to the effect that it has been detected that the capacity of an SDV or an SDPE is to be increased, the SDP setting section 332 detects whether the SDP is insufficient (operation S502). That is, the SDP setting section 332 detects whether the capacity of the SDP is to be increased. Here, if the SDP setting section 332 detects that the SDP is insufficient (operation S502: YES), the SDP setting section 332 judges whether there is a free storage area in the RAID groups (operation S503). That is, the SDP setting section 332 judges whether or not there is a free storage area for which setting of an SDP is permitted, in the disk 200.

If the SDP setting section 332 judges that there is a free storage area in the RAID groups (operation S503: YES), the SDP setting section 332 judges whether there is a free storage area for setting an SDP in each of the multiple RAID groups (operation S504). If there is a free storage area for setting an SDP in each of the multiple RAID groups (operation S504: YES), the SDP setting section 332 determines one RAID group (operation S505) and sets an SDP (operation S506). That is, an SDPV is set in the determined RAID group and used as an SDP. If there is no free storage area for setting an SDP in each of the multiple RAID groups (operation S504: NO), the SDP setting section 332 sets an SDP in one RAID group having free space (operation S506).

On the other hand, if it is judged at the operation S502 that the SDP is sufficient (operation S502: NO), the processing is ended. If it is judged at the above operation S503 that there is no free storage area (operation S503: NO), the processing sends information to the effect that there is no free storage area, to the policy operation section 333 (operation S507), and the processing is ended.

Figure 12:
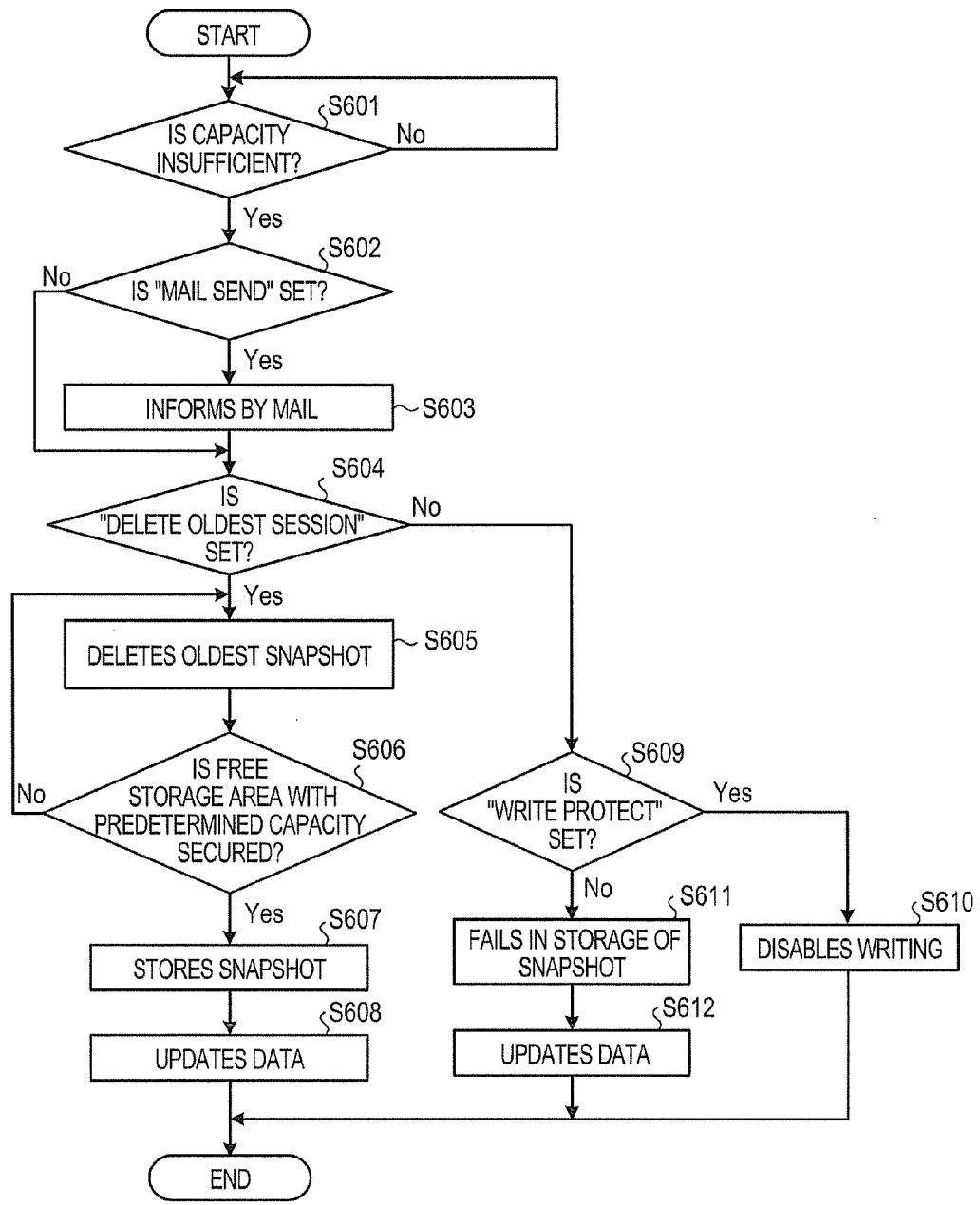
FIG. 12 illustrates an example of a flow of processing based on a policy by a backup apparatus in an embodiment.

Next, an example of a flow of processing based on a policy by a backup apparatus in an embodiment will be described with the use of FIG. 12. In FIG. 12, description will be made on the case where an instruction to update a copy-source volume is issued from the administrator when the control section 330 stores a snapshot into a storage area, and an SDV or an SDP is insufficient then.

When the capacity is insufficient (operation S601: YES), that is, for example, when accepting information to the effect that there is no sufficient capacity, from the SDP setting section 332, the policy operation section 333 judges whether the policy "Mail Send" is set (operation S602). That is, the policy operation section 333 judges whether the administrator sets that the policy "Mail Send" is to be used. If judging that the policy "Mail Send" is set (operation S602: YES), the policy operation section 333 informs the administrator of information to the effect that there is no sufficient capacity by mail (operation S603).

After that, if the policy operation section 333 judges that the policy "Mail Send" is not set (operation S602: NO) or notifies it by mail (operation S603), the policy operation section 333 judges whether the policy "Delete Oldest Session" is set (operation S604). That is, the policy operation section 333 judges whether the administrator sets that the policy "Delete Oldest Session" is to be used. If judging that the policy "Delete Oldest Session" is set (operation S604: YES), the policy operation section 333 deletes the oldest snapshot (operation S605), and judges whether a free storage area with a predetermined capacity is secured (operation S606). If the policy operation section 333 judges that no free area with a predetermined capacity is secured (operation S606: NO), the policy operation section 333 repeats the processings of operations S605 and S606 until it judges that a free area with the predetermined capacity is secured.

After that, for example, by the SDP setting section 332 setting an SDP in a secured free storage area and the assignment section 331 assigning an SDPE, the control section 330 stores a snapshot into the storage area (operation S607), and the copy-source volume is updated (operation S608).

On the other hand, if it is judged at the above operation S604 that the policy "Delete Oldest Session" is not set (operation S604: NO), the policy operation section 333 judges whether the policy "Write Protect" is set (operation S609: YES). That is, the policy operation section 333 judges whether the administrator sets that the policy "Write Protect" is to be used. Here, if judging that the policy "Write Protect" is set (operation S609: YES), the policy operation section 333 disables writing (operation S610). That is, storage of a snapshot is disabled after it is judged that there is no free storage area. On the other hand, if the policy operation section 333 judges that the policy "Write Protect" is not set (operation S609: NO), for example, the control section 330 fails in processing for storing the snapshot into the storage area (operation S611), and after that, the copy-source volume is updated in a state that backup has failed (operation S612).

Figure 13:
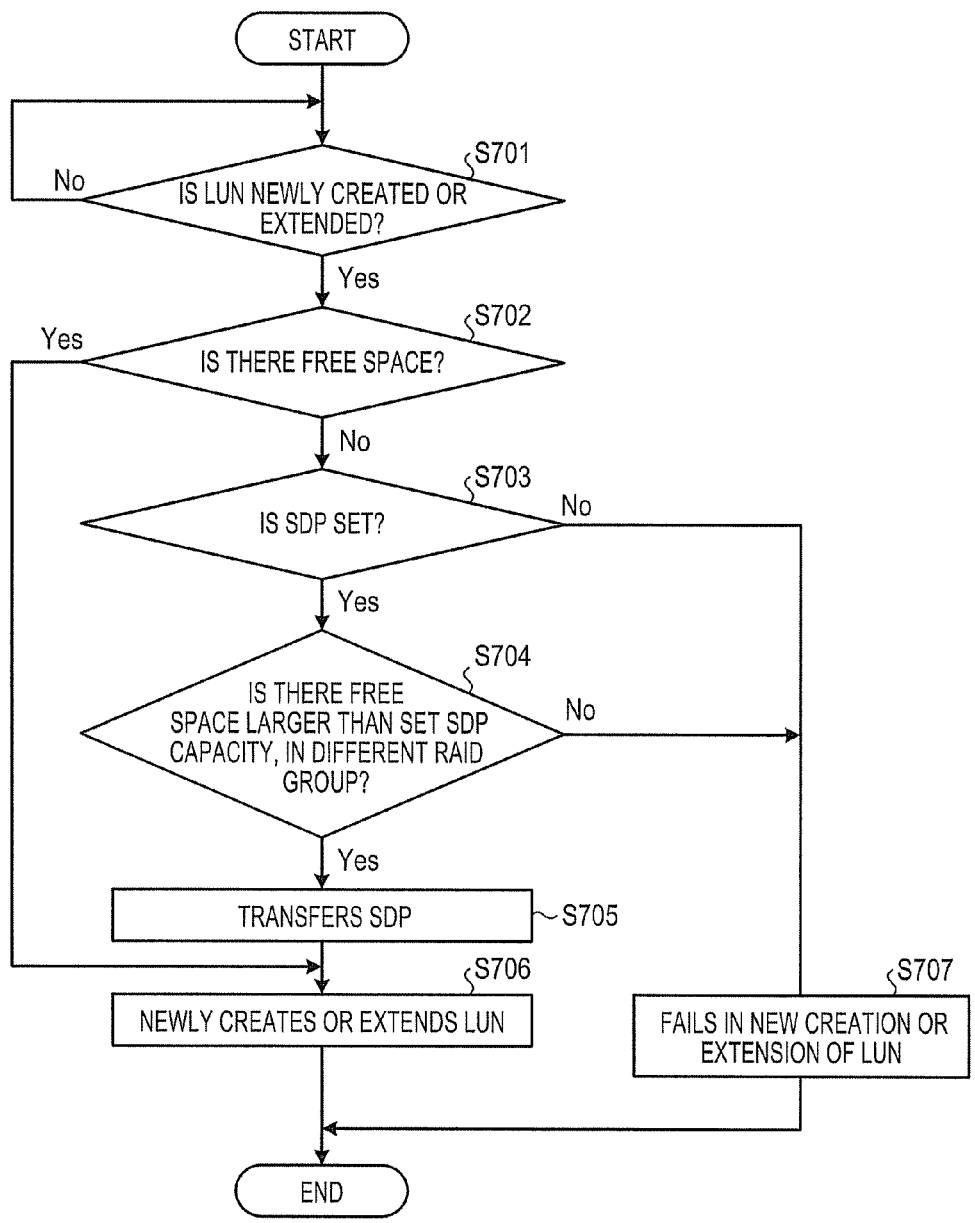
FIG. 13 illustrates a flow of SDP transfer processing by a backup apparatus an embodiment.

Next, the flow of the SDP transfer processing by a backup apparatus in an embodiment will be described with the use of FIG. 13. FIG. 13 is a flowchart for illustrating a flow of the SDP transfer processing by the backup apparatus in an embodiment.

When receiving an instruction to newly create or extend an LUN from the administrator (operation S701: YES), the SDP transfer section 334, for example, detects whether there is free space (operation S702). That is, the SDP transfer section 334 detects whether a predetermined free storage area capacity is secured. When detecting that there is no free space (operation S702: NO), that is, detecting that the predetermined free storage area capacity is not secured, the SDP transfer section 334 detects whether an SDP is set for a storage area in a target RAID group (operation S703). Here, if detecting that an SDP is set (operation S703: YES), the SDP transfer section 334 detects whether there is free space equal to or larger than the capacity of the set SDP in a different RAID group (operation S704). When determining there is no newly created LUN (operation S701: NO), the process continues the detection until there is a newly created LUN.

Here, if detecting that the free space is secured (operation S704: YES), the SDP transfer section 334 transfers the SDP (operation S705). That is, the SDP transfer section 334 transfers the SDP to a free storage area which is not assigned to any generation, within the storage area in the RAID group different from the target RAID group. After that, a LUN is newly created or extended in a free area generated by the SDP having been transferred by the SDP transfer section 334 (operation S706). Similarly, in the case where it is detected at the above operation S702 that there is free space (operation S702: YES) also, a LUN is newly created or extended (operation S706).

On the other hand, if it is judged (determined) at the above operation S703 that an SDP is not set (operation S703: NO) or if it is detected at the above operation S704 that there is no free space (operation S704: NO), new creation or extension of a LUN fails (operation S707), and the processing is ended.

As described above, according to an embodiment, when an SDV or SDPE the capacity of which is to be increased is detected, an SDPE is assigned to the SDV or SDPE the capacity of which is to be increased, from an SDP. Furthermore, it is detected whether to increase the capacity of the SDP. If it is detected that the capacity of the SDP is to be increased, the SDP is set in a free storage area which is not assigned to any generation. Thus, it is possible to appropriately set an SDP.

For example, when the capacity of an addition-source area is insufficient, the apparatus can automatically set an additional storage area, unlike the technique in which it is necessary to wait a user to newly set the storage area. As a result, it is possible to newly assign an additional storage area without waiting for setting by the user.

Furthermore, according to an embodiment, if a storage area in any storage device among multiple storage devices is in a state that the free space is to be increased, an SDP set for a storage area in the target storage device is transferred. Specifically, since the SDP is transferred to a free storage area which is not assigned to any generation, within a storage area in a storage device different from the target storage device, it is possible to increase the free space in the target storage device.

Furthermore according to an embodiment, since an addition-source area set in a storage area in a target storage device is distributed and transferred to storage areas in one or multiple different storage devices, it is possible to transfer the addition-source area, for example, even in the case where the addition-source area cannot be transferred to one different storage device.

Furthermore, according to an embodiment, even in the case where the capacity of an addition-source area is insufficient, it is possible to avoid shortage of the addition-source area since processing based on a policy for the purpose of avoiding shortage of the addition-source area is performed.

An embodiment of the present invention has been described. However, the present invention may be practiced in other embodiments in addition to the embodiment described above. Therefore, another embodiment will be described below.

In an embodiment, description has been made based on the assumption of using SnapOPC. However, the present invention is not limited thereto, and it can be practiced using a different backup technique. For example, in the case of OPC, by encrypting backup data, an amount of data backed up differs among generations. Therefore, in the case of using an additional storage area, the technique for setting an additional storage area which has been described in an embodiment may be implemented for the OPC.

In an embodiment, description has been made on a technique in which multiple RAID groups are provided. However, the present invention is not limited thereto, and only one RAID group may be provided. It is also possible to provide one or multiple storage devices in which a RAID group is not formed, instead of providing a RAID group.

In an embodiment, description has been made on a technique in which the SDP transfer section 334 transfers an SDP. However, the present invention is not limited thereto, and an SDV in a target storage device may be transferred.

In an embodiment, description has been made on an example of implementing (1) a technique for transferring an SDP, (2) a technique for distributing and transferring an SDP and (3) a technique for performing processing based on a policy, in combination with a technique for automatically setting an SDP. However, the present invention is not limited thereto. One or more methods among (1) to (3) may be implemented in addition to the technique for automatically setting an SDP. The technique of (2) is implemented in combination with the technique of (1).

Among the processing(s) described in the embodiment(s), all or a part of processing which has been described to be automatically performed can be manually performed. For example, the processing based on a policy may be manually performed.

In addition, information including the processing procedures, control procedures, specific names, and various data and parameters, illustrated in the above document and drawings (for example, FIG. 1, FIG. 2 and FIGS. 4 to 13) can be arbitrarily changed unless otherwise specially mentioned.

Each component of each device shown in the figures is illustrated from a viewpoint of a functional concept, and it is not necessarily required to be physically configured as illustrated in the figures. That is, the concrete form of distribution/integration of each device is not necessarily limited to that illustrated in the figures. Each device can be configured by functionally or physically distributing/integrating all or a part thereof in any units according to various loads or use states. For example, to describe this with reference to FIG. 2, the disk 200 may be distributedly arranged and connected via a network.

The various processing(s) described in the above embodiment(s) can be realized by executing a program prepared in advance by a computer such as a personal computer and a workstation. Therefore, description will be made below on an example of a computer which executes a backup program having functions similar to those of the above embodiments, with the use of FIG. 14.

Figure 14:
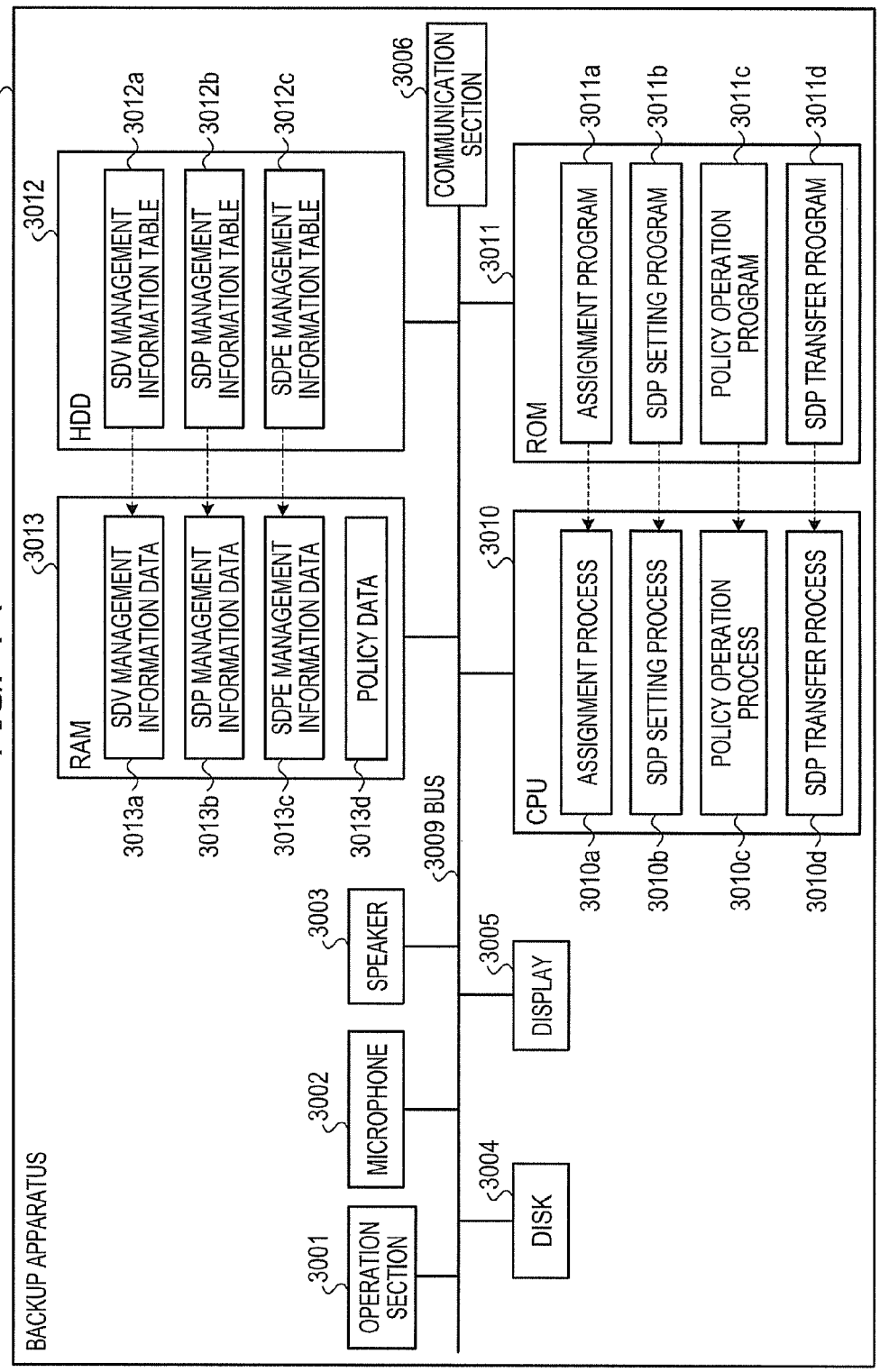
FIG. 14 illustrates an example of a computer which executes a backup program according to an embodiment.
Figure 15:
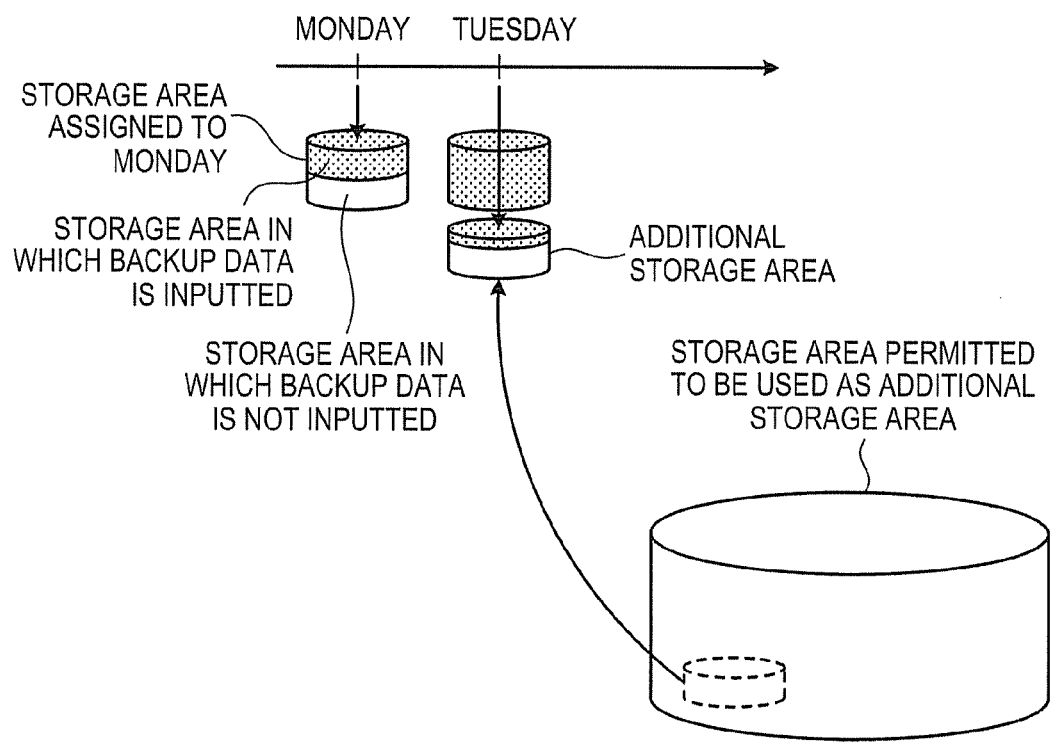
FIG. 15 illustrates a typical technique.

As illustrated in FIG. 14, a backup apparatus 3000 in an embodiment is provided with an operation section 3001, a microphone 3002, a speaker 3003, a disk 3004, a display 3005, a communication section 3006 and a CPU (Central Processing Unit) 3010. The backup apparatus 3000 is further provided with a ROM (Read-Only Memory) 3011, an HDD (Hard Disk Drive) 3012 and a RAM (Random Access Memory) 3013.

The backup apparatus 3000 is configured by connecting the operation section 3001, the microphone 3002, the speaker 3003, the disk 3004, the display 3005, the communication section 3006, the CPU 3010, the ROM 3011, the HDD 3012 and the RAM 3013 via a bus 3009 or the like. The disk 3004 corresponds to the disk 200 in FIG. 2.

In the ROM 3011, there are stored in advance control programs which illustrate function(s) similar to those of the assignment section 331, the SDP setting section 332, the policy operation section 333 and the SDP transfer section 334 shown in an embodiment described above, that is, an assignment program 3011a, an SDP setting program 3011b, a policy operation program 3011c and an SDP transfer program 3011d as illustrated in FIG. 14. These programs 3011a to 3011d may be appropriately integrated or separated similarly to each component of the backup apparatus illustrated in FIG. 2.

By the CPU 3010 reading these programs 3011a to 3011d from the ROM 3011 and executing them, the programs 3011a to 3011d function as an assignment process 3010a, an SDP setting process 3010b, a policy operation process 3010c and an SDP transfer process 3010d, respectively, as illustrated in FIG. 14. The processes 3010a to 3010d correspond to the assignment section 331, the SDP setting section 332, the policy operation section 333 and the SDP transfer section 334 illustrated in FIG. 2, respectively.

In the HDD 3012, there are provided an SDV management information table 3012a, an SDP management information table 3012b and an SDPE management information table 3012c. The tables 3012a to 3012c correspond to the SDV management information storage section 321, the SDP management information storage section 322 and the SDPE management information storage section 323 illustrated in FIG. 2, respectively.

The CPU 3010 reads the SDV management information table 3012*a*, the SDP management information table 3012*b* and the SDPE management information table 3012*c* and stores them into the RAM 3013, and executes the backup program using SDV management information data 3013*a*, SDP management information data 3013*b*, SDPE management information data 3013*c* and policy information data 3013*d* stored in the RAM 3013.

The program can be distributed via a network such as the Internet. It is also possible to record the program in a computer-readable recording medium such as a hard disk, a flexible disk (FD), a CD-ROM, an MO and a DVD and execute them by reading them from the recording medium by a computer.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A backup apparatus which stores backup data at a predetermined time point into a storage area, the backup apparatus comprising:
   a plurality of storage devices, one of the storage devices including a storage area having a backup data storage area that stores backup data and having an addition-source area that is added to the backup data storage area when a capacity of the backup data storage area is insufficient;
   a detection section which detects whether to increase a capacity of the backup data storage area based on set allocations within the backup data;
   an assignment section which assigns, corresponding with one of the set allocations associated with the backup data when detecting that the capacity of the backup storage area is to be increased, a portion of the addition-source area having no set allocations within the backup data storage area;
   an addition-source detection section which detects whether to increase a capacity of the portion of the addition-source area based on the set allocation; and
   a setting section which automatically sets an unassigned storage area of the addition-source area in accordance with the set allocation when detecting that the capacity of the portion of the addition-source area is to be increased, and
   a transfer section including:
      determining whether the one of the storage devices has a predetermined free storage area capacity, when receiving an instruction to add a new backup data storage area in the one of the storage devices from an administrator,
      determining whether the addition-source area is set in the one of the storage devices, when determining that the one of the storage devices has capacity below the predetermined free storage area capacity,
      determining whether another storage device has a free storage area equal to or larger than the capacity of the additional-source area in the one of the storage devices, when determining that the additional-source area is set in the one of the storage devices,
      transferring an additional-source area to the other storage device, when determining that the free storage area is secured in the other storage device,
   wherein the new backup data storage area is set in a free storage area, generated by transferring the additional-source area, in the one of the storage devices.

2. The backup apparatus according to claim 1, wherein the transfer section distributes and transfers the addition-source area in the one of the storage devices to storage areas in multiple different storage devices.

3. The backup apparatus according to claim 1, comprising:
   a storage area detection section which detects whether a free storage area capacity for which setting of the addition-source area by the setting section is permitted is secured when detecting that the capacity is to be increased; and
   a processing section which performs a processing based on a policy for avoiding shortage of a storage area for storing a snapshot when detecting that the predetermined free storage area capacity is not secured.

4. The backup apparatus according to claim 3, wherein the processing section performs a processing based on any one or more policies among a policy of informing an administrator that the predetermined free storage area capacity is not secured, a policy of deleting snapshots stored in a storage area in a chronological order beginning with a snapshot at an oldest time point until a preset capacity is reached, and a policy of disabling storage of a snapshot after detecting that the capacity is to be increased.

5. A backup method for storing backup data at a predetermined time point into a storage area assigned as a backup data storage area, the method comprising:
   detecting whether to increase a capacity of the storage area assigned as the backup data storage area based on set allocations within the backup data;
   assigning, corresponding with one of the set allocations associated with the backup data when detecting that the capacity of the backup storage area is to be increased, a portion of an addition-source area having no set allocations within the backup data storage area;
   detecting whether to increase a capacity of the portion of the addition-source area based on the set allocation; and
   automatically setting an unassigned storage area of the addition-source area in accordance with the set allocation when detecting that the capacity of the portion of the addition-source area is to be increased;
   determining whether the one of the storage devices has a predetermined free storage area capacity, when the backup apparatus receives an instruction to add a new backup data storage area in the one of the storage devices from an administrator;

determining whether the addition-source area is set in the one of the storage devices, when determining that the one of the storage devices has capacity below the predetermined free storage area capacity;

determining whether another storage device has a free storage area equal to or larger than the capacity of the additional-source area in the one of the storage devices, when determining that the additional-source area is set in the one of the storage devices; and transferring an additional-source area to the other storage device, when determining that the free storage area is secured in the other storage device, setting the new backup data storage area in a free storage area, generated by transferring the additional-source area, in the one of the storage devices.

6. The backup method according to claim 5, comprising:

distributing and transferring the addition-source area in the one of the storage devices to storage areas in multiple different storage devices.

7. The backup method according to claim 5, comprising:

detecting whether a free storage area capacity for which setting of the addition-source area is permitted is secured when detecting that the capacity is to be increased; and performing a processing based on a policy for avoiding shortage of a storage area for storing a snapshot when determining that the predetermined free storage area capacity is not secured.

8. The backup method according to claim 7, comprising:

performing a processing based on any one or more policies among a policy of informing an administrator that the predetermined free storage area capacity is not secured, a policy of deleting snapshots stored in a storage area in chronological order beginning with the snapshot at an oldest time point until a preset capacity is reached, and a policy of disabling storage of a snapshot after detecting that the capacity is to be increased.

* * * * *